Sept. 8, 1942.    J. H. SMITH    2,295,135
CONTOUR MACHINING TOOL
Filed Oct. 24, 1939    2 Sheets-Sheet 1

INVENTOR.
J. Hugo Smith

BY
Barnes, Kisselle, Laughlin & Raisch
ATTORNEYS.

Sept. 8, 1942.   J. H. SMITH   2,295,135
CONTOUR MACHINING TOOL
Filed Oct. 24, 1939   2 Sheets-Sheet 2

INVENTOR.
J. Hugo Smith
BY
Barnes, Kisselle, Laughlin & Raisch
ATTORNEYS.

Patented Sept. 8, 1942

2,295,135

UNITED STATES PATENT OFFICE 2,295,135

CONTOUR MACHINING TOOL

J. Hugo Smith, Detroit, Mich.

Application October 24, 1939, Serial No. 301,026

9 Claims. (Cl. 77—58)

This invention relates to a machining tool and has particularly to do with a tool which may be used for contour machining.

In the manufacture of shells, it is now customary to make the casing out of a solid member where previously the rear of the shell was threaded into the cylindrical casing. When the shells are made out of an integral piece, a problem arises in obtaining the proper machined surface particularly on the inside of the shell. The present invention contemplates a machining tool which, while particularly adapted for internal work, is also suitable for external work.

It is an object to provide a tool which is especially useful on the contour or curved portions of a cylindrical body. Another object is to provide a tool support which will carry the tool in a definite predetermined path and which is arranged to shift the tool away from the work surface upon a predetermined movement thereof.

Briefly, the objects of the invention are accomplished by mounting a tool supporting lever on a shiftable rotating driving member and associating a cam member with the driving member in such a way that relative movement of the driving member with respect to the cam member will shift the tool supporting lever in the proper manner. The invention also contemplates a novel locking mechanism for the cam member.

A further object of the invention has to do with a method of forming a projectile shell out of a single integral piece of material.

Other objects and features of the invention relating to details of operation and construction, will be brought out in the following description and claims.

Figure 1:
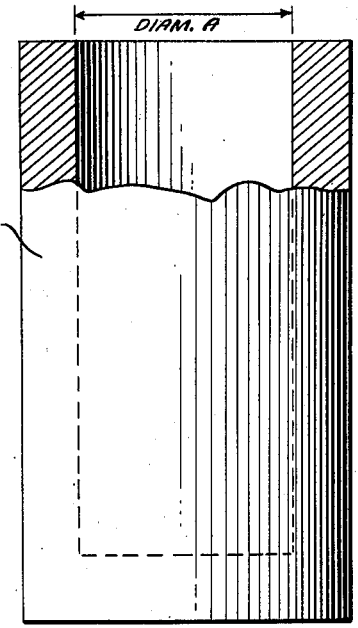
Fig. 1 is an illustration of a shell housing prior to its formation at the forward end.
Figure 4:
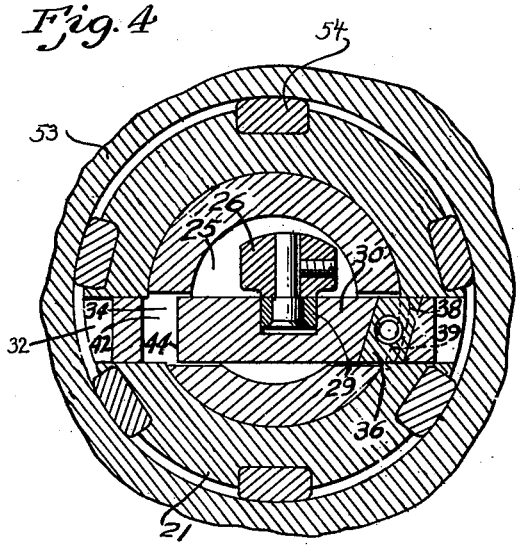
Fig. 4 is a section taken on the lines 4—4 of Fig. 3.
Figure 5:
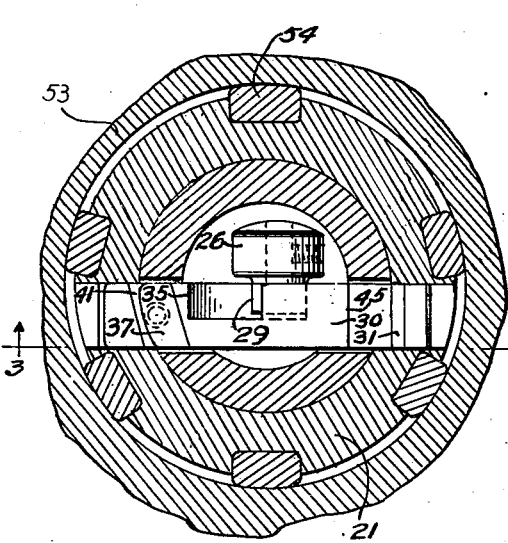
Fig. 5 is a section taken on the lines 5—5 of Fig. 3.
Figure 2:
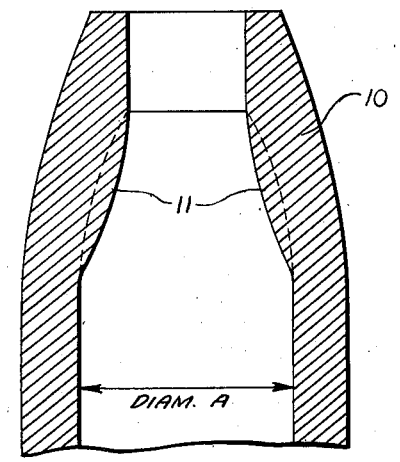
Fig. 2 is a view of the shell housing after it has been forged into shape and before it has been machined internally.

Referring to the drawings, in Fig. 1 a shell casing 10, after being cast, is machined with an internal bore having a diameter A. The hole is finish bored and in the next operation the top or open end of the casing is closed in by a forging operation, as shown in Fig. 2. Material, shown at 11, inside the dotted lines, must be removed if the casing is to have the proper shape internally.

Figure 3:
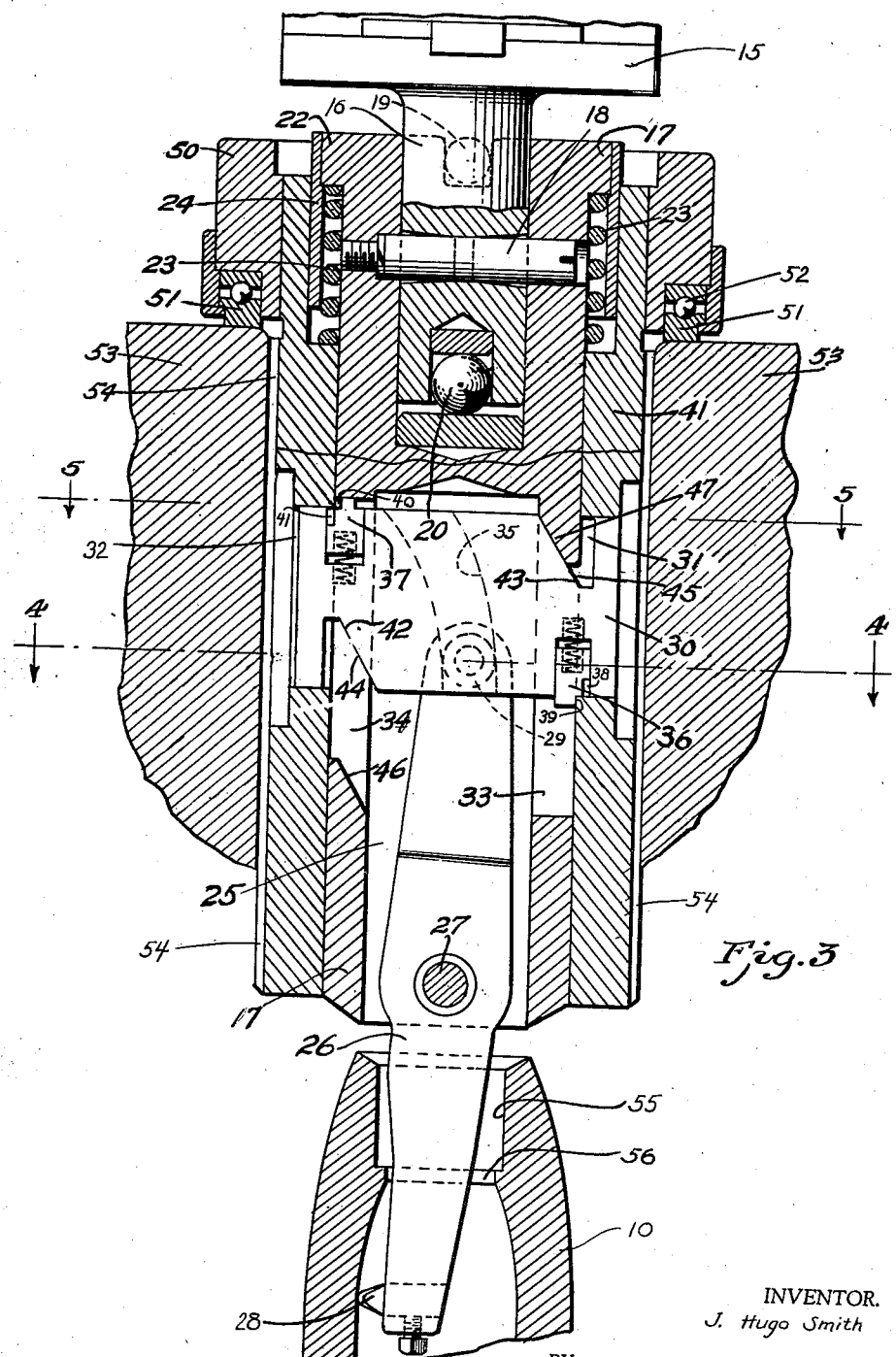
Fig. 3 is a longitudinal section of a boring tool constructed in accordance with the present invention.

The cam turning tool illustrated in Fig. 3 is used for removing the stock 11 and blending it into the turned part of the shell. Referring to Fig. 3, the shell is shown at 10. In the machining tool, a driving spindle 15, which is to be received in a vertical drill press, has a downwardly projecting shank 16 which is received by an axial bore in a central driving member 17. The shank 16 is connected to the member 17 by a stud 18 and a stud 19 which provide a floating connection between the two members. A thrust ball 20 is provided to transmit axial forces between the members. The central driving member 17 is slidably splined in a sleeve 21 which extends substantially the entire length of the member 17. The upper end of member 17 is flanged at 22 to cooperate with the upper end of sleeve 21 which is recessed to receive a spring 23. A supplementary sleeve 24 serves as a spring guide and is received within the recess in the sleeve 21. Spring 23 urges the central driving member 17 upwardly with respect to the sleeve 21. The lower end of the driving member 17, as it is viewed in the drawings, is provided with an axial bore 25 which extends slightly more than half way through the driving member. A tool supporting lever 26 is pivoted on a pin 27 which extends transversely of member 17 through the axial recess therein. The outer end of the lever 26 extends from the recess 25, and a tool 28 is mounted on the end thereof. The inner end of the lever 26 extends upwardly into the recess 25. On the upper end of this lever is a roller 29 which is to serve as a guide or controlling element for the lever. Between pin 27 and tool 28 the lever 26 lies centrally of the assembly so that tool 28 lies in a plane normal to the pin 27 and passing through the axis of driving member 17. Between pin 27 and roller 29 the lever 26 is offset to avoid interference with cam block 30 and allow roller 29 to work in groove 35.

Slidably mounted diametrically of the sleeve 21 is a cam block 30 which is substantially rectangular in its form. The sleeve 21 is provided with opposed openings 31 and 32 which receive the ends of the cam block 30 and form a guide so that the block may shift transversely of the sleeve. The walls of the driving member 17 are also provided with opposed openings 33 and 34 through which the cam block passes. The cam block is provided with a curved groove 35 which receives the roller 29 on lever 26 and forms a guide for the roller. It will be seen that if the driving member 17 is shifted with respect to the cam block, there will be a movement of the lever 26.

Means are provided for locking the cam block against transverse movement. These means consist of spring pressed plungers 36 and 37 which are adapted to cooperate with the shoulder formed by the inner wall of the sleeve 21 and one of the sides of the openings 31 and 32, respectively, in the sleeve 21. The plunger 36 is provided with two offset notches 38 and 39 while plunger 37 is provided with notches 40 and 41.

When both of the locking means 36 and 37 are released, the notches 39 and 41 will cooperate to maintain the cam block 30 in the position shown in the drawings, and the notches 38 and 40 will cooperate to maintain the cam block in another position where the block is shafted to the left, as viewed in the drawings. The plunger 36 is shown in the locked position while plunger 37 is shown in a released position. The cam block 30 is provided with openings 42 and 43, each of which has a cam surface 44 and 45. At one end of the opening 34 in the wall of driving member 17 is a cam 46 intended to cooperate with cam surface 44 of cam block 30. Similarly, one end of opening 33 in driving member 17 has a cam member 47 adapted to cooperate with cam surface 45 of cam block.

On the lower shoulder of a flange 50 of the sleeve 21 is a bearing ring 51 which is mounted to rotate on balls in the bearing 52. This ring 51 is arranged to contact a bushing member 53 when the spindle 15 is lowered to a certain point, as shown in the drawings. The entire tool rotates within the bushing 53 and wear pieces 54 are provided on the outer surface of sleeve 21 to contact the bushing 53.

In the operation of the device, after the end of the shell 10 has been counter-bored as at 55, the spindle 15 is lowered with the driving member 17 and sleeve 21 within the bushing 53. As bearing ring 51 reaches the bushing 53, as shown in the drawings, the tool 28 will be about to contact a shoulder 56 of the shell 10. At this time the cam or control member 30 will be transversely in the same position with respect to the driving member 17 in which it is shown in Fig. 3. However, axially the cam member 30 will be at the lower portion of the opening 33 and 34. When the ring 51 stops the downward movement of sleeve 21, the cam member 30 will also be stopped but the spindle 15 and the driving member 17 will continue to lower. During this movement the roller 29 will follow the cam slot 35 and the tool 28 will be moved in a curve which is shown between the tool and the shoulder 56 in Fig. 3. As the tool 28 reaches the point in which it is illustrated, it will be seen that the plungers 37 are contacted by the upper end of the opening 34 in driving member 17. This depresses the plunger and releases the left edge of the cam member 30. At the same time the cam 47 contacts the surface 43 of cam 30 and upon slight further downward movement of member 17, cam member 30 is shifted to the left. This will remove the tool 28 from the work surface which it is contacting since the upper arm of lever 26 will also be shifted to the left. At the end of this left shifting of cam 30, the notch 40 will contact the inner wall of sleeve 21 and the lock plunger 36 will be shifted so that the notch 38 may permit it to slip down to a second locking position. Consequently, the cam member 30 will again be locked in what may be referred to as a "non-cutting" position. At this point, the machining will cease and the tool may be elevated. Spring 23 now comes into action to restore parts 17 and 21 to their initial relative positions. During this restoring movement the roller 29 will move the tool out of the shell in a path which is identical with the inward shaft except that the tool is spaced from the work. As the tool reaches the point 56 in the shell, the cam surface 46 on member 17 will strike the cam surface 44 and also the lower end of opening 33 will contact and release the plunger 36, thus permitting the cam block 30 to be shifted back to the position in which it is shown. The tool may then be further retracted, the spring 23 serving to maintain the members 17 and 21 in proper relative positions until the machining operation is started with a new work piece. It will thus be seen that as the tool 28 is retracted from the work, it is again shifted to its cutting position in readiness for the next piece.

I claim:

1. In a machine tool, an internal driving member, a tool support on said driving member comprising a lever pivoted substantially at the center portion and arranged axially of said driving member, one end of said lever extending from said driving member, a tool on the outwardly extending end of said lever, a sleeve surrounding said driving member, and a cam block located transversely of said driving member and said sleeve provided with a cam surface for contacting a surface projecting from the inner end of said tool supporting lever, and cam surfaces provided respectively on said driving member and said cam block whereby predetermined relative axial movement between said driving member and said sleeve will cause a diametrical shifting of said cam block with respect to said driving member and said sleeve to effect a movement of said tool toward or away from a surface to be machined.

2. A contour machining tool comprising a cylindrical driving member adapted to be rotated and shifted to and from the work, an axial opening in the work end of said driving member, a lever having one end extending into said opening and the other end extending from said opening and pivoted on said driving member, a tool on the outer end of said lever, a sleeve surrounding said driving member arranged to rotate with, but shift axially relative to, said driving member, a transverse cam block slidably mounted for diametric movement within said sleeve and passing through said driving member, a cam surface on said cam block adapted to cooperate with a surface on said lever arranged to impart a definite contour movement to said tool in response to relative movement between said sleeve and said driving member, and means on said cam block and said driving member responsive to a predetermined axial relative movement between said sleeve and said driving member to effect a diametric shifting of said cam block and a corresponding movement of said lever whereby said tool will be shifted toward or away from the work surface.

3. A contour machining tool comprising a cylindrical driving member adapted to be rotated and shifted to and from the work, an axial opening in the work end of said driving member, a lever having one end extending into said opening and the other end extending from said opening and pivoted on said driving member, a tool on the outer end of said lever, a sleeve surrounding said driving member arranged to rotate with, but shift axially relative to, said driving member, a transverse cam block slidably mounted for diametric movement within said sleeve and passing through said driving member, a cam surface on said cam block adapted to cooperate with a surface on said lever arranged to impart a definite contour movement to said tool in response to relative movement between said sleeve and said driving member, means on said cam block and said driving member responsive to a predetermined axial relative movement between said sleeve and said driving member to effect a diametric shifting of said cam block and a corresponding movement of said lever whereby said tool will be shifted toward or away from the work surface, and locking means for said cam block arranged to prevent shifting thereof except at the respective ends of a predetermined stroke of a tool.

4. A contour machining tool comprising a driving member, a tool supporting member pivoted on said driving member, means mounting a control member relative to said driving member and said tool supporting member whereby relative movement between said driving member and said control member will shift said tool in a predetermined movement, and means for locking said control member against movement in one direction with respect to said driving member, said means comprising spring pressed plungers, each having two locking surfaces adapted to cooperate to lock the control member in one of two positions, said plunger members being arranged to be released from locking position by predetermined relative movement of said driving member and said control member.

5. A contour machining tool comprising a driving member, a tool supporting member pivoted thereon, a cam control member mounted with respect to said driving member and operably connected with said tool supporting member whereby relative movement between said driving member and said control member will result in a predetermined movement of said tool, said control member being shiftable with respect to said driving member to change the line of movement of said tool, and cam means on said driving member and said control member for shifting the control member to cutting and non-cutting positions at the end of non-cutting and cutting strokes of said driving member.

6. A contour machining tool comprising a driving member, a tool supporting member pivoted thereon, a cam control member mounted with respect to said driving member and operably connected with said tool supporting member whereby relative movement between said driving member and said control member will result in a predetermined movement of said tool, said control member being shiftable with respect to said driving member to change the line of movement of said tool, cam means on said driving member and said control member for shifting the control member to cutting and non-cutting positions at the end of non-cutting and cutting strokes of said driving member, and means for locking the control member in one of its two positions during the strokes of said driving member.

7. A contour machining tool comprising a cylindrical driving member adapted to be rotated and shifted to and from the work, an axial opening in the work end of said driving member, a lever having one end extending into said opening and the other end extending from said opening and pivoted on said driving member, a tool on the outer end of said lever, a sleeve surrounding said driving member arranged to rotate with, but shift axially relative to, said driving member, a transverse cam block slidably mounted for diametric movement within said sleeve and passing through said driving member, a cam surface on said cam block adapted to cooperate with a surface on said lever arranged to impart a definite contour movement to said tool in response to relative movement between said sleeve and said driving member, means on said cam block and said driving member responsive to a predetermined axial relative movement between said sleeve and said driving member to effect a diametric shifting of said cam block and a corresponding movement of said lever whereby said tool will be shifted toward or away from the work surface, and locking means for said cam block arranged to prevent shifting thereof except at the respective ends of a predetermined stroke of a tool.

8. A contour machining tool comprising a cylindrical driving member adapted to be rotated and shifted to and from the work, an axial opening in the work end of said driving member, a lever having one end extending into said opening and the other end extending from said opening and pivoted on said driving member, a tool on the outer end of said lever, a sleeve surrounding said driving member arranged to rotate wtih, but shift axially relative to, said driving member, a transverse cam block slidably mounted for diametric movement within said sleeve and passing through said driving member, a cam surface on said cam block adapted to cooperate with a surface on said lever arranged to impart a definite contour movement to said tool in response to relative movement between said sleeve and said driving member, means on said cam block and said driving member responsive to a predetermined axial relative movement between said sleeve and said driving member to effect a diametric shifting of said cam block and a corresponding movement of said lever whereby said tool will be shifted toward or away from the work surface, locking means for said cam block arranged to prevent shifting thereof except at the respective ends of a predetermined stroke of a tool, and restoring means urging said sleeve and driving member to a retracted relative position, said restoring means acting upon a withdrawal movement of said driving member to cause relative movement of said sleeve and driving member to the original retracted relative position and effect, through said cam, the withdrawal movement of said tool in a path parallel to, but spaced from, its original cutting path.

9. A contour machining tool comprising driving members arranged for relative lengthwise movement, a tool member pivoted on one of said members, cam means supported on said members, means on said tool member cooperating with said cam whereby relative lineal movement between said driving members will impart relative contour motion to said tool, means for imparting a lineal and rotating movement to said driving members, and means acting on one of said driving members to restrain the same from further lineal movement after a predetermined lineal movement, restoring means urging said driving members to their original lineal relative position, said cam means being shiftable relative to said driving members to change the line of movement of said tool in response to predetermined cutting movement of said tool member, said restoring means acting upon withdrawal movement of said driving members to restore them to their initial relative position and effect, through said cam, the withdrawal movement of said tool in a path parallel to, but spaced from, its original cutting path.

J. HUGO SMITH.